(12) United States Patent
Bischofberger et al.

(10) Patent No.: US 7,484,493 B2
(45) Date of Patent: Feb. 3, 2009

(54) INSERT FOR A CYLINDER SLEEVE OR A CYLINDER OF AN INTERNAL COMBUSTION ENGINE

(75) Inventors: Ulrich Bischofberger, Esslingen (DE); Kay Stapelbroek, Stuttgart (DE)

(73) Assignee: Mahle International GmbH, Stuttgart (DE)

( * ) Notice: Subject to any disclaimer, the term of this patent is extended or adjusted under 35 U.S.C. 154(b) by 113 days.

(21) Appl. No.: 11/787,973

(22) Filed: Apr. 18, 2007

(65) Prior Publication Data
US 2008/0150237 A1    Jun. 26, 2008

(30) Foreign Application Priority Data
Dec. 20, 2006    (DE) .................... 10 2006 060 330

(51) Int. Cl.
*F02P 1/00* (2006.01)
*F02P 5/00* (2006.01)
(52) U.S. Cl. .................. 123/193.3; 123/193.2
(58) Field of Classification Search .............. 123/193.2, 123/193.3
See application file for complete search history.

(56) References Cited
U.S. PATENT DOCUMENTS

| 3,489,130 | A | | 1/1970 | Polidan et al. | |
|---|---|---|---|---|---|
| 4,189,161 | A | * | 2/1980 | Grimm | 277/496 |
| 4,474,147 | A | | 10/1984 | Hoopes | |
| 4,475,739 | A | * | 10/1984 | Nakajima et al. | 277/442 |
| 4,575,107 | A | * | 3/1986 | Umegawa | 277/499 |
| 4,770,133 | A | | 9/1988 | Schibalsky | |
| 4,848,212 | A | * | 7/1989 | Kawano et al. | 92/158 |
| 5,033,426 | A | * | 7/1991 | Reichenbach et al. | 123/193.3 |
| 5,203,294 | A | * | 4/1993 | Takemura et al. | 123/195 HC |
| 5,209,197 | A | * | 5/1993 | Melchior | 123/193.3 |
| 6,536,385 | B1 | * | 3/2003 | Takashima | 123/73 C |

FOREIGN PATENT DOCUMENTS

| DE | 35 43 668 A1 | 6/1987 |
|---|---|---|
| DE | 198 11 780 C1 | 8/1999 |
| DE | 103 21 034 B3 | 1/2005 |

* cited by examiner

*Primary Examiner*—Erick Solis
(74) *Attorney, Agent, or Firm*—Collard & Roe, P.C.

(57) ABSTRACT

An insert for a cylinder sleeve or a cylinder of an internal combustion engine is provided for narrowing the diameter of the cylinder sleeve or cylinder in the region of the upper dead center of a piston guided in the cylinder sleeve or cylinder. The insert is formed as an open, biased ring having a ring joint, which ring is held radially by means of its radial forces, which act outward, and axially by a recess in the cylinder sleeve or cylinder, in such a manner that the radial surface pressure is approximately the same on the circumference, whereby its ratio of ring wall thickness (d) to inside diameter (D) of the cylinder sleeve or the cylinder amounts to between 0.001 and 0.02.

23 Claims, 3 Drawing Sheets

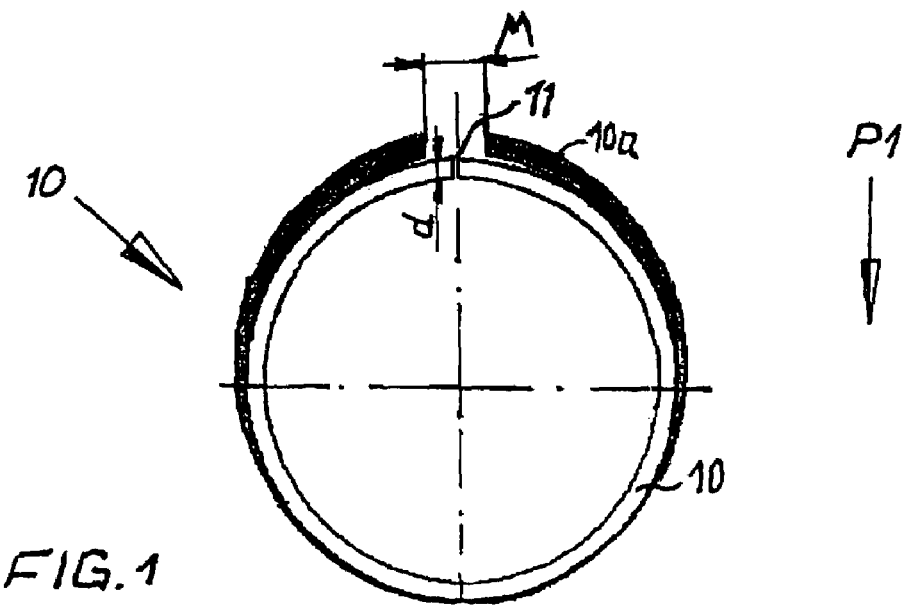
FIG. 1
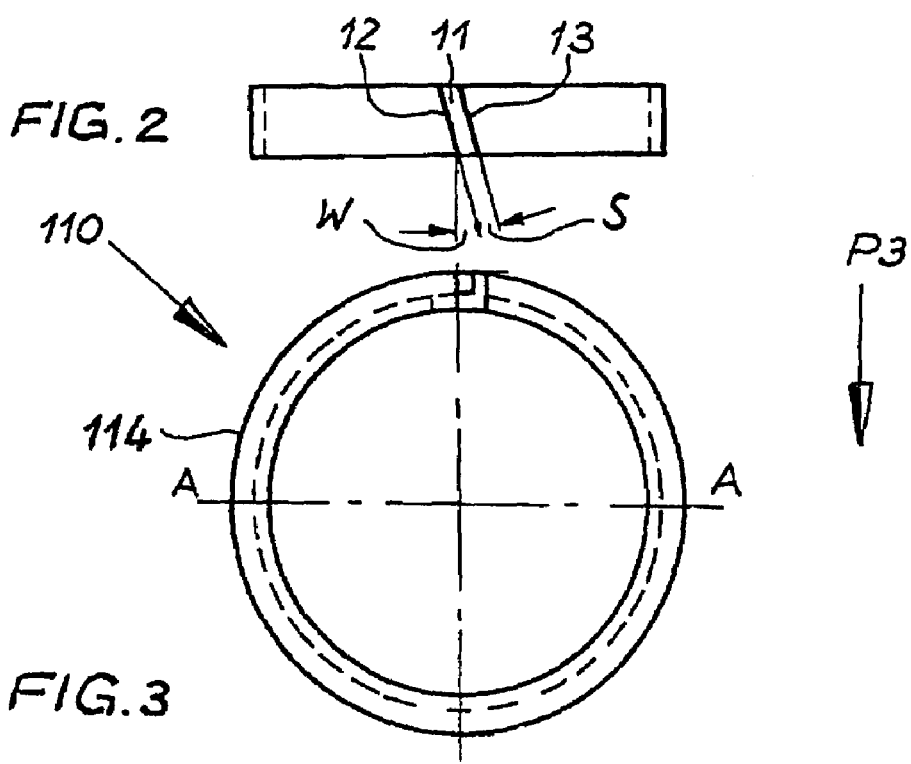
FIG. 2
FIG. 3
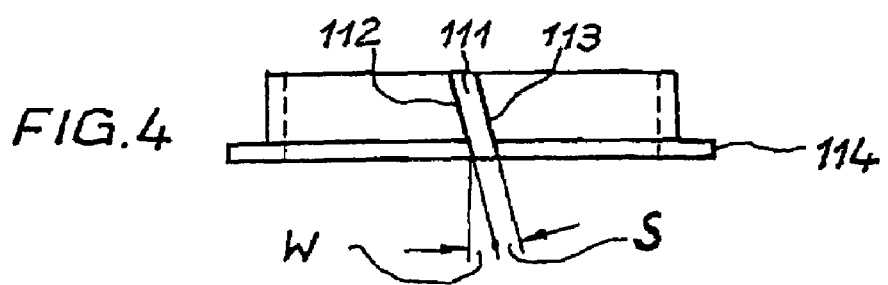
FIG. 4

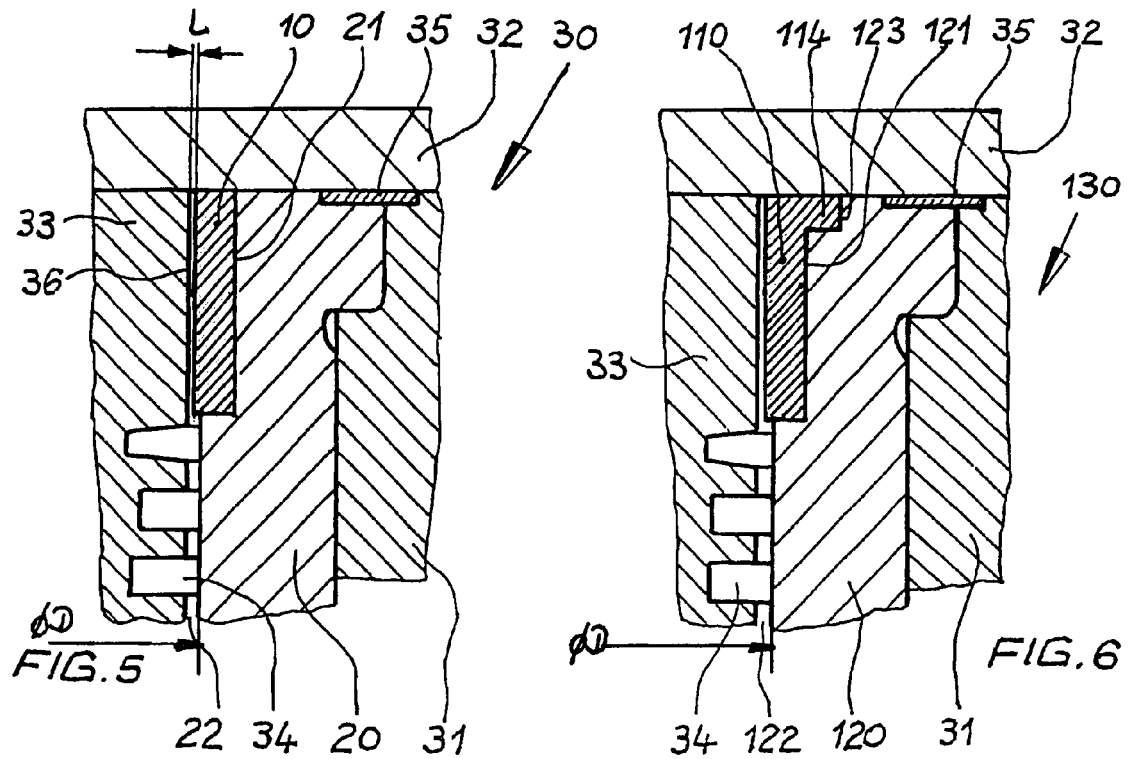
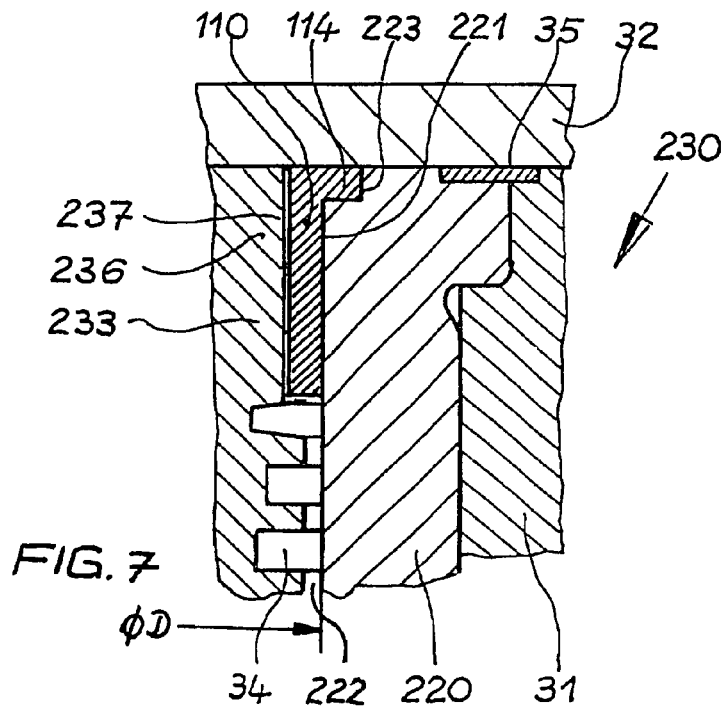

INSERT FOR A CYLINDER SLEEVE OR A CYLINDER OF AN INTERNAL COMBUSTION ENGINE

BACKGROUND OF THE INVENTION

1. Field of the Invention

The present invention relates to an insert for a cylinder sleeve or a cylinder of an internal combustion engine, for narrowing the diameter of the cylinder sleeve in the region of the top land at the upper dead center of a piston guided in the cylinder sleeve. Such an insert serves to strip off carbon that accumulates on the top land, and prevents contact of the carbon with the working surfaces of the cylinder sleeve or the cylinder.

2. The Prior Art

An insert of this type is described in U.S. Pat. No. 3,489,130. This reference describes a piston/cylinder arrangement for internal combustion engines, to which a ring-shaped insert is assigned in order to form a narrowed segment of the inside wall of the cylinder.

A combined device consisting of a sealing element towards the cylinder head and carbon stripper is described in U.S. Pat. No. 4,474,147. For this purpose, the closed ring insert is structured angled away towards the cylinder head.

A similar insert is described in German Patent No. DE 35 43 668 A1. In this case, the insert, formed as a deep-drawn part or lathed part, is held by means of a radial collar, which is pressed against the cylinder crankcase by the cylinder head.

Another insert is described in German Patent No. DE 103 21 034 B3. This reference describes a reciprocating piston internal combustion engine having a cylinder head and a cylinder crankcase with a sleeve to which a ring-shaped insert is assigned. The insert projects beyond the sleeve on its cylinder-head-side end, and is fitted between the sleeve and the cylinder head, preferably without play. After assembly of the cylinder head, the insert is subject to pressure stress, and thereby held in the sleeve.

A similar insert is described in DE 35 43 668 A1. In this case, the insert, formed as a deep-drawn part or lathed part, is held by a radial collar that is pressed against the cylinder crankcase by the cylinder head. Such inserts are difficult to produce and fit into the sleeve, because of the close tolerances in production and assembly, and therefore are not optimally suited for series production.

Additional inserts are described in German Patent No. DE 103 21 034 B3 and DE 198 11780 C1.

All of the inserts described in the references cited above have in common that they are always formed from closed rings.

SUMMARY OF THE INVENTION

It is therefore an object of the invention to create an insert for a cylinder sleeve or a cylinder of an internal combustion engine, which can be produced and assembled in a simple and cost-effective manner, achieves a reliable effect, and can be used in many different ways.

According to the invention, the insert is formed as an open, biased ring having a ring joint. The ring, in the biased state, i.e. inserted in the cylinder sleeve or cylinder, is held radially by its radial forces, which act outward, and axially by a recess made in the cylinder sleeve or in the cylinder.

The ratio of ring wall thickness (d) to inside diameter (D) of the cylinder sleeve or of the cylinder amounts to between 0.001 and 0.02. The shape of the non-biased ring is configured in such a manner that the radial surface pressure is approximately the same on the circumference in the state when the ring is inserted in the cylinder or cylinder sleeve.

Furthermore, a cylinder sleeve having an insert formed as an open, biased ring having a ring joint, which insert is held by radial forces that act outward and axially by means of its position in a recess in the cylinder sleeve, is an object of the present invention.

The insert according to the invention is implemented for the first time as an open, biased ring, which is shaped and dimensioned so that it is held in the cylinder sleeve solely by forces that act radially outward. For this purpose, the outside diameter of the insert according to the invention is dimensioned in such a manner that it is pressed against the inside surface of the cylinder sleeve with an approximately equal radial surface pressure on the circumference, in the region of the cylinder bushing in which it is installed, and axially guided in a recess. In this connection, the embodiments for the insert according to the invention comprise a ratio of wall thickness d to cylinder diameter D between 0.003 and 0.01.

This structuring principle according to the invention allows significantly lesser structural sizes for the insert according to the invention than were possible until now. In particular, the wall thickness of the insert can be clearly reduced as compared with the state of the art. At the same time, the stability of the cylinder sleeve is maintained, because the wall of the cylinder sleeve is not weakened by an excessively deep groove. The reduced structural size of the insert according to the invention also allows its use not only in large diesel engines for utility vehicles, but in practically all types of engines, including passenger car engines, and small engines, such as two-cylinder engines, for example. The insert according to the invention can be produced in a simple and cost-advantageous manner, and is easily installed. The tolerances are dimensioned in such a manner that series production is possible and also economically efficient.

The insert according to the invention can particularly be produced using a method that is also an object of the present invention. The method according to the invention provides punching a strip having a defined width from a sheet-metal part, and forming the strip into an open, biased ring having a ring joint in the same working step or subsequently. The ring is subsequently introduced into the cylinder sleeve or cylinder, so that the radial surface pressure on the circumference is approximately the same. A ratio of ring wall thickness to inside diameter of the cylinder sleeve of 0.001 to 0.02 is achieved.

This method can be implemented in series production a particularly simple and economically efficient manner.

Furthermore, a cylinder crankcase and an internal combustion engine that are provided with cylinder sleeves having an insert according to the invention are also objects of the invention.

It is advantageous if the ring is configured with a suitable ring joint play, in order to avoid contact between the joint surfaces during operation of the internal combustion engine, due to thermal expansion.

It is advantageous if the joint ends of the ring joint that face one another run at a defined angle (W) parallel to one another. In the case of this configuration, it is assured that the carbon is removed from the top land of the piston as completely as possible, even in the region of the ring joint.

The insert according to the invention can have a circumferential flange that extends radially, particularly in the case of large cylinder diameters, in order to further increase its stability and the forces that act radially. In the assembled state, the flange can lie on the face surface of the cylinder sleeve or in a recess provided in the face surface of the cylinder sleeve.

The wall thickness of the insert according to the invention can amount to 0.5 mm to 0.8 mm, for example. When the insert according to the invention is held in a recess provided in the cylinder sleeve, the contact surface required for the insert (wall thickness minus excess length, 0.1 mm to 0.4 mm, for example) in the cylinder sleeve can be greatly reduced, so that the wall of the cylinder sleeve is not excessively weakened. Instead, however, the piston disposed in the cylinder sleeve can also have a recess along its top land, into which the insert projects.

In particular, the insert according to the invention can be produced from sheet metal.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views:

FIG. 1 shows a front view of a first embodiment of an insert according to the invention;

FIG. 2 shows the insert according to FIG. 1 in a front view in the direction of the arrow P1 in FIG. 1;

FIG. 3 shows a front view of another embodiment of an insert according to the invention;

FIG. 4 shows the insert according to FIG. 3 in a front view in the direction of the arrow P3 in FIG. 3;

FIG. 5 shows an enlarged partial representation of the insert according to FIG. 1 in the installed state, with a recess in the cylinder sleeve, in section;

FIG. 6 shows an enlarged partial representation of the insert according to FIG. 3 in the installed state, with a recess in the cylinder sleeve, in section;

FIG. 7 shows an enlarged partial representation of the insert according to FIG. 3 in the installed state, in section, with a piston with a recess in the top land;

DETAILED DESCRIPTION OF THE PREFERRED EMBODIMENT

Figure 8:
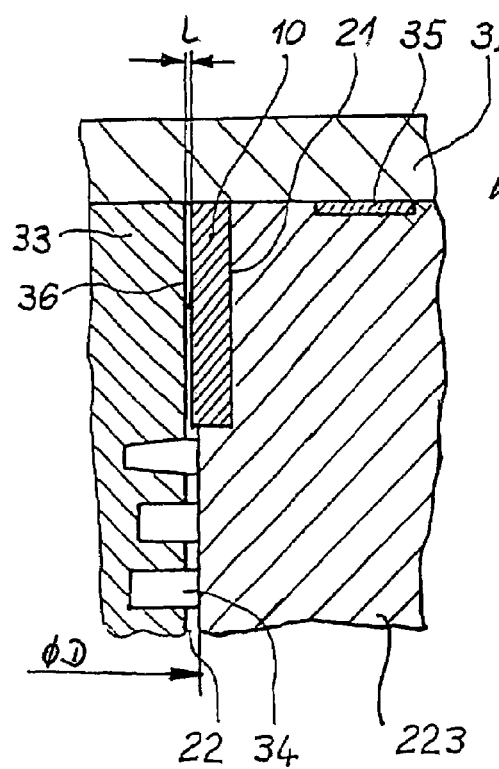
FIG. 8 shows an enlarged partial representation of the insert according to FIG. 1 in the installed state, in a cylinder with a recess in the cylinder, in section.

Referring now in detail to the drawings, FIGS. 1 and 2 show a first embodiment of an insert 10 according to the invention. Reference symbol 10a shows the non-biased ring. Insert 10 is a punched part made from sheet steel having a sheet thickness d of 0.4 to 0.7 mm. In this embodiment, insert 10 is made for a cylinder sleeve 20 having an inside diameter of 130 mm. Insert 10 is punched out as a sheet-metal strip, and formed into an open, biased ring 10 either in the same work step or subsequently. Insert 10 has a ring joint 11 that is determined by its joint ends 12, 13. In the assembled state, ring joint S is dimensioned in such a manner that it is not completely closed, but rather a certain joint play remains, so that joint ends 12, 13 of the insert 10 do not touch even in the case of heat expansion during operation. Joint ends 12, 13 of the ring joint 11 that face one another run at a defined angle (W) parallel to one another (cf. FIG. 2). With this, a closed contour of the insert 10 is achieved, so that the top land of the piston guided in the cylinder sleeve 20 is freed of carbon over its entire mantle surface, if possible. Insert 10 is held in the inside surface of the cylinder sleeve or in the cylinder according to FIG. 8 by means of radial forces that act outward; axially it is fixed in place by means of a recess in the cylinder sleeve or cylinder. In this connection, a ratio of ring wall thickness d and inside diameter D of the cylinder sleeve (see FIG. 10) of 0.003 to 0.01 is preferably obtained.

For a cylinder having a nominal diameter of 130 mm, an insert made of sheet steel having a wall thickness of 0.8 mm was implemented. In order to sufficiently bias the insert after installation in the cylinder, a mouth width M on the non-biased insert of 20 mm was set. The outside shape was structured in such a manner that a uniform surface pressure results over the circumference of the installed insert.

FIGS. 3 and 4 show a second exemplary embodiment of an insert 110 according to the invention. Insert 110 is essentially the same as the insert 10 according to FIGS. 1 and 2, and is also a punched part made of a sheet steel having a sheet thickness d of 0.7 mm, for a cylinder sleeve having an inside diameter of 130 mm. To produce insert 110, a sheet-metal strip is also punched out, the one longitudinal edge of which is bent away to form a flange 114. Then, the sheet-metal strip is formed into an open, biased ring. The finished insert 110 also has a ring joint 111, which allows a certain joint play in the assembled state. Joint ends 112, 113 of ring joint 111 that face one another run at a defined angle (W) parallel to one another (cf. FIG. 4). With this, a closed contour is achieved also in the case of insert 110, so that the top land of the piston guided in the cylinder sleeve is freed of carbon over its entire mantle surface, if possible.

Figure 9:
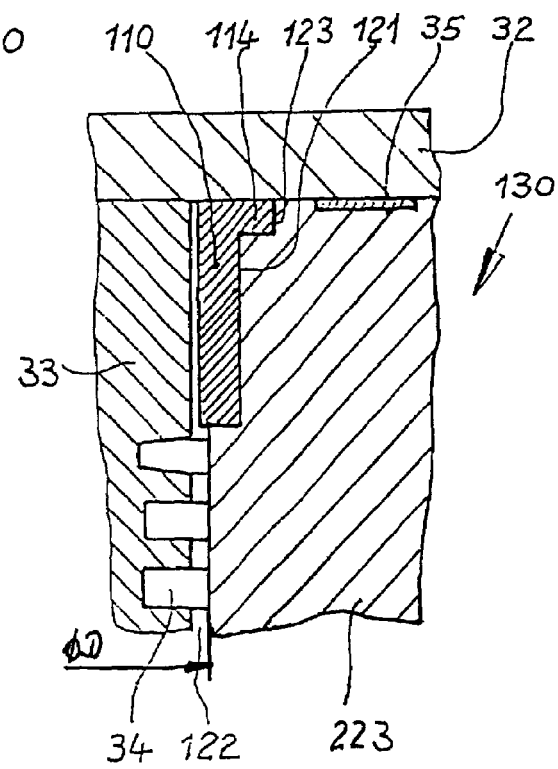
FIG. 9 shows an enlarged partial representation of the insert according to FIG. 3 in the installed state, in a cylinder with a recess in the cylinder, in section.

FIG. 5 shows a detail of an internal combustion engine 30 having a cylinder crankcase 31 and a cylinder head 32. A cylinder head seal 35 is laid in between cylinder crankcase 31 and cylinder head 32. Cylinder sleeves 20 are accommodated in cylinder bores of cylinder crankcase 31, in interior 22 of which sleeves a piston 33 is guided. Analogous to this, piston 33 can also be guided in a cylinder, as shown in FIGS. 8 to 10. Piston 33 is provided with piston rings 34, which seal off the combustion chamber (not shown). Above piston rings 34, there is the circumferential top land 36 of piston 33.

An insert 10 according to the first embodiment of FIGS. 1 and 2 is accommodated in a recess 21 of cylinder sleeve 20. In this connection, the contact surface for insert 10, which corresponds to the depth of recess 21, amounts to 0.4 mm. This means that at a sheet-metal thickness of 0.7 mm, insert 10 projects into interior 22 of cylinder sleeve 20 with an excess length (Ü) of 0.3 mm. Insert 10 is accommodated in cylinder sleeve 20 in the region of the upper dead center of the piston 33, i.e. in the region of reversal of the movement of piston 33 during operation. With this, the entire region of top land 36 is stroked by insert 10 when piston 33 moves during operation. This guarantees that any carbon that has deposited is completely and reliably removed from top land 36.

FIG. 6 shows a detail of another exemplary embodiment of an internal combustion engine 130, which is essentially structured like internal combustion engine 30 shown in FIG. 5. Components that agree with one another are therefore provided with the same reference symbol. An insert 110 according to the second exemplary embodiment of FIGS. 3 and 4 is accommodated in a recess 121 of cylinder sleeve 120. In addition, cylinder sleeve 120 is provided with a circumferential recess 123 at its upper face surface, facing cylinder head 32, in which circumferential flange 114 of insert 110 is accommodated. In this connection, the contact surface for insert 110, which corresponds to the depth of the recess 121, amounts to 0.4 mm in the exemplary embodiment. This means that at a sheet-metal thickness of 0.7 mm, insert 110 projects into the interior 122 of cylinder sleeve 120 with an excess length (L) of 0.3 mm. Insert 110 is accommodated in cylinder sleeve 120 in the region of the upper dead center of the piston 33, i.e. in the region of the reversal of movement of piston 33 during operation. With this, the entire upper region of top land 36, which lies closest to the combustion chamber and therefore is most exposed to accumulation of carbon, is stroked by the insert 110 when piston 33 moves during operation. This guarantees that any carbon that has deposited is completely and reliably removed from top land 36.

FIG. 7 shows a detail of another exemplary embodiment, how an insert 110 according to the second exemplary embodiment shown in FIGS. 3 and 4 can be accommodated in an internal combustion engine 230. Again, components that agree with one another are provided with the same reference symbols. Insert 110 is now merely accommodated in a circumferential groove 223 with its flange 114, which groove is provided in the upper face surface of cylinder sleeve 220, facing cylinder head 32. Insert 110 projects into a recess 237 in top land 236 of piston 233. In this connection, the depth of recess 237 amounts to 0.4 mm in the exemplary embodiment. Insert 110 is also disposed in the region 221 of the upper dead center of the piston 233, i.e. in the region of the reversal of movement of the piston 233 during operation. With this, the entire region of the recess 237 provided in the top land 236, which lies closest to the combustion chamber and therefore is most exposed to accumulation of carbon, is stroked by insert 110 when piston 233 moves during operation. This guarantees that any carbon that has deposited is completely and reliably removed from top land 236.

FIGS. 8, 9, and 10 each show an embodiment in which cylinder sleeve 20, 120, 220 has been eliminated, but the same aforementioned conditions apply in accordance with the explanations relating to FIGS. 5 to 7 respectively, for a cylinder of the internal combustion engine.

Accordingly, while only a few embodiments of the present invention have been shown and described, it is obvious that many changes and modifications may be made thereunto without departing from the spirit and scope of the invention.

What is claimed is:

1. A insert for a cylinder sleeve or a cylinder of an internal combustion engine, for narrowing the inside diameter (D) of the cylinder sleeve or cylinder in a region of a top land at an upper dead center of a piston guided in the cylinder sleeve or cylinder, the insert comprising:

an open, biased ring having a ring joint, said ring being held only by means of its outwardly-acting radial forces, and axially via a recess in the cylinder sleeve or cylinder, so that radial surface pressure is approximately equal around a circumference of said ring, wherein a ratio of ring wall thickness(d) of the insert to inside diameter (D) of the cylinder sleeve or the cylinder amounts to between 0.001 and 0.02.

2. An insert according to claim 1, wherein the ratio of ring wall thickness (d) to inside diameter (D) of the cylinder sleeve or the cylinder amounts to between 0.003 and 0.01.

3. An insert according to claim 1, wherein the ring joint has a defined joint play.

4. An insert according to claim 1, wherein joint ends of the ring joint that face one another run at a defined angle parallel to one another.

5. An insert according to claim 1, wherein the insert has a radially extending circumferential flange.

6. An insert according to claim 1, wherein the wall thickness (d) amounts to 0.5 mm to 0.8 mm.

7. An insert according to claim 1, wherein the insert is made from sheet metal.

8. A cylinder sleeve for a cylinder bore of a cylinder crankcase of an internal combustion engine, comprising:

an insert that narrows an inside diameter (D) of the cylinder sleeve in a region of an upper dead center of a piston guided in the cylinder sleeve, wherein the insert comprises an open, biased ring having a ring joint, said ring being held in such a manner that a radial surface pressure is approximately equal around a circumference of the insert, wherein a ratio of ring wall thickness (d) of the insert to inside diameter (D) of the cylinder sleeve amounts to between 0.001 and 0.02.

9. A cylinder sleeve according to claim 8, wherein the ratio of ring wall thickness (d) to inside diameter (D) of the cylinder sleeve or the cylinder preferably amounts to between 0.003 and 0.01.

10. A cylinder sleeve according to claim 8, wherein the ring joint has a defined joint play.

11. A cylinder sleeve according to claim 8, wherein joint ends of the ring joint run at a defined angle parallel to one another.

12. A cylinder sleeve according to claim 8, wherein the insert is held in a recess provided in the cylinder sleeve.

13. A cylinder sleeve according to claim 8, wherein the insert has a radially extending circumferential flange that lies on a face surface of the cylinder sleeve or in a groove provided in the face surface of the cylinder sleeve.

14. A cylinder sleeve according to claim 8, wherein the wall thickness (d) of the insert amounts to 0.5 mm to 0.8 mm.

15. A cylinder sleeve according to claim 8, wherein the insert has an excess length (L) of 0.1 mm to 0.4 mm.

16. A cylinder sleeve according to claim 8, wherein the insert is made from sheet metal.

17. A cylinder crankcase for an internal combustion engine, having at least one cylinder sleeve according to claim 8.

18. An internal combustion engine having a crankcase whose cylinder bores have at least one cylinder sleeve according to claim 8.

19. An internal combustion engine according to claim 17, further comprising a piston disposed on each of the cylinder sleeves, each of said pistons having a recess along their top land, into which the insert projects.

20. An internal combustion engine according to claim 17, wherein the engine is a diesel engine for a utility vehicle.

21. An internal combustion engine according to claim 17, wherein the engine is a passenger car engine.

22. An internal combustion engine according to claim 17, wherein the engine is a two-stroke engine.

23. A method for the production of an insert for a cylinder sleeve or a cylinder of an internal combustion engine, for narrowing a diameter of the cylinder sleeve or cylinder in a region of a top land at an upper dead center of a piston guided in the cylinder sleeve or cylinder, comprising the following steps:

punching a strip having a defined width from a sheet-metal part;

forming the strip into an open, biased ring having a ring joint simultaneously with said step of punching, or subsequently thereto; and subsequently introducing said ring into the cylinder sleeve or cylinder, so that a radial surface pressure around a circumference of the ring is approximately equal, wherein a ratio of ring wall thickness (d) of the insert to inside diameter (D) of the cylinder sleeve amounts to between 0.001 and 0.02.

* * * * *